Figure 1:
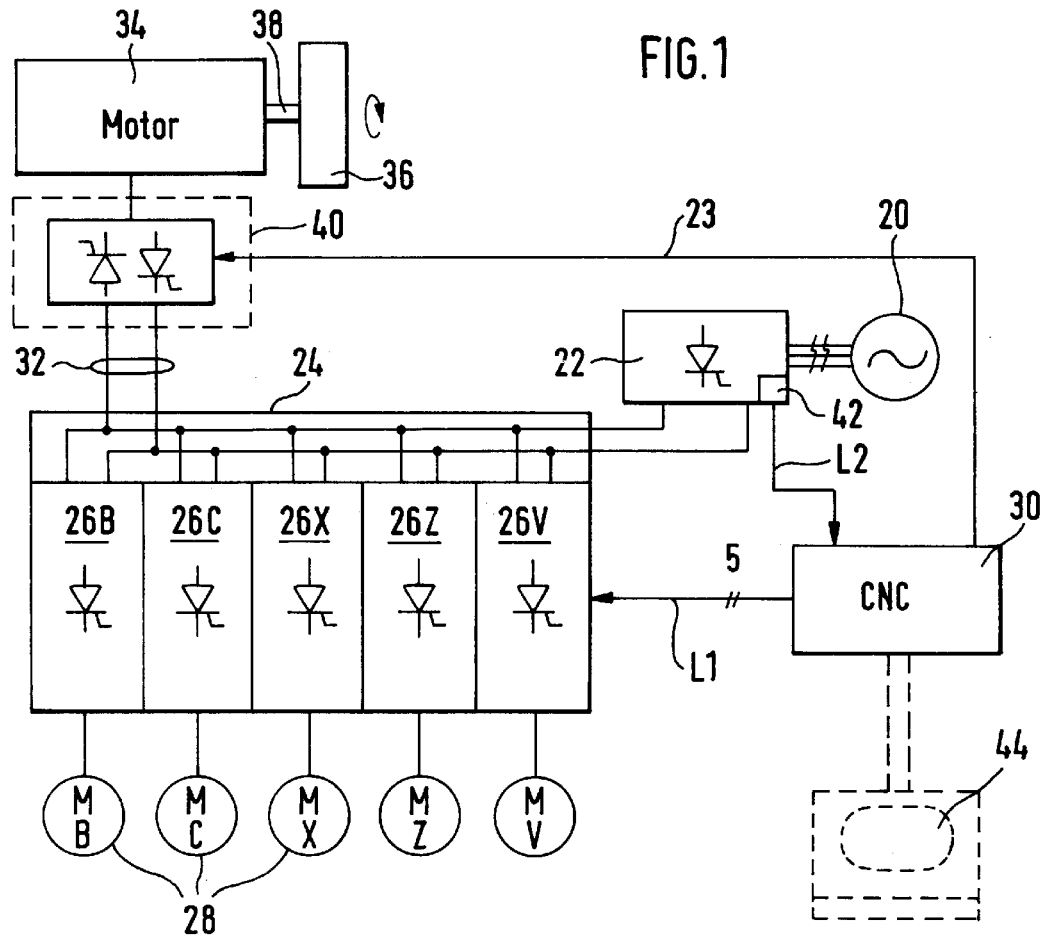

United States Patent
Schuon

[11] Patent Number: 5,839,861
[45] Date of Patent: Nov. 24, 1998

[54] GEAR-CUTTING MACHINE WITH EMERGENCY POWER SUPPLY

[75] Inventor: Joachim Schuon, Buchenberg, Germany

[73] Assignee: Liebherr Verzahntechnik GmbH, Germany

[21] Appl. No.: 810,933

[22] Filed: Feb. 27, 1997

[30] Foreign Application Priority Data

Feb. 28, 1996 [DE] Germany ............ 296 03 668 U

[51] Int. Cl.⁶ .................................................. B23F 1/00
[52] U.S. Cl. ........................ 409/2; 318/150; 318/563; 318/565; 409/80; 409/134
[58] Field of Search ................... 318/150, 569, 318/563, 565; 409/2, 80, 134

[56] References Cited

U.S. PATENT DOCUMENTS

| | | | |
|---|---|---|---|
| 2,637,006 | 4/1953 | Harris et al. | 318/150 |
| 4,446,408 | 5/1984 | Ebermann et al. | 318/600 |
| 4,612,494 | 9/1986 | Kawamura | 322/4 |
| 5,065,060 | 11/1991 | Takahashi et al. | 310/74 |
| 5,631,851 | 5/1997 | Tanaka et al. | 364/551.01 |
| 5,646,458 | 7/1997 | Bowyer et al. | 318/150 |

*Primary Examiner*—Andrea L. Pitts
*Assistant Examiner*—Christopher Kirkman
*Attorney, Agent, or Firm*—Jagtiani & Associates

[57] ABSTRACT

A gear-cutting machine contains one driving motor (28) with a corresponding actuator (26a, 26c ...) for each of various adjusting axes (B, C, X, Z ...). The actuators are supplied from a common dc intermediate circuit (24) and controlled by a controller (30). The dc intermediate circuit (24) is supplied by a rectifier circuit (22) from the network (20). For defined stopping of at least some of the driving motors (28) of the adjusting axes an emergency power supply is provided. The emergency power supply contains an ac motor (34) with a disk flywheel (36) mounted on the output shaft (38) thereof. In generating service of the ac motor (34) the latter provides direct-voltage energy to the ac intermediate circuit (34) via the actuator/rectifier (40). This energy suffices for at least some of the driving motors (28) to be brought into a state of rest by their corresponding actuators in controlled fashion. This avoids errors when operation of the machine is continued.

4 Claims, 1 Drawing Sheet

GEAR-CUTTING MACHINE WITH EMERGENCY POWER SUPPLY

This invention relates to a machine tool, in particular gear-cutting machine, having a plurality of electric driving motors for each adjusting axis of the machine, and one actuator provided for each driving motor, said actuator being connected to a direct-current source supplied from a network and controlled by an NC controller.

Such gear-cutting machine are known, for example in the form of hobbing machines or the like, for producing gearwheels.

Figure 2:
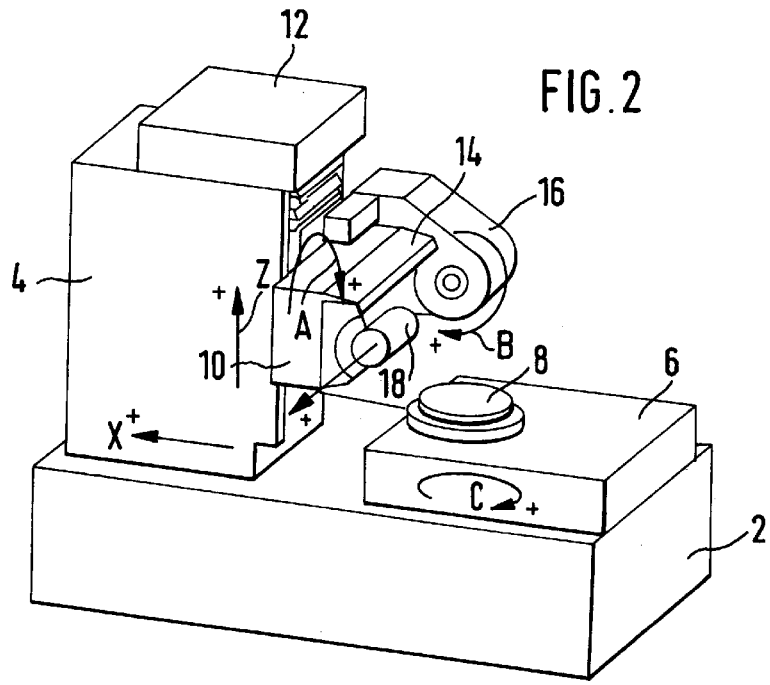

FIG. 2 of the enclosed drawing shows schematically the structure of a gear-cutting machine. To make the invention better understandable, the structure of this machine will be briefly explained, the details of the machine not shown here being familiar to the expert so that a detailed description is dispensed with. It should be noted that the invention described in the following is not restricted to this specific type of gear-cutting machine, but that the invention is applicable to all machine tools having the abovementioned features.

According to FIG. 2, stand 4 is disposed on machine bed 2 so as to be movable in the direction of arrow X and bears Z slide 10 on one side facing workpiece receiving table 6, said slide being movable upward and downward in the direction of arrow Z on a guide indicated in FIG. 2. The Z slide bears swivel member 14, and the latter bears rotary drive 15 for tool 16. Swivel member 14 can be swiveled in the direction of arrow A. The working direction of rotary drive 16 is marked by arrow B. The tool can be adjusted by a corresponding driving motor in the direction of arrow V.

On top of stand 4 there is control box 12 containing the power supply and electronics for supplying and controlling the driving motors not shown in detail here which produce the motion around the various adjusting axes X, Z . . .

Workpiece receiving table 6 bears workpiece carrier 8 which is rotatable according to arrow C by a driving motor not shown.

The mode of operation of such a gear-cutting machine is known in the art. A workpiece held on the workpiece carrier is machined by tool 18, whereby at least one of the driving motors contained in the gear-cutting machine for the various adjusting axes is in service.

In case of a power failure all driving motors in service come to a stop after a relatively short slowing-down time. In this state the tool is in contact with the workpiece. When the line voltage is fully available again later, the gear-cutting machine would in this situation start in an undefined state. The state of the machine, in particular the state of engagement between tool and workpiece, is thereby undefined, since in case of a power failure a driving motor comes to a stop more or less quickly depending on the load acting on the particular driving motor. It is practically impossible to start the machine out of an undefined state without errors occurring in the gear-cutting work; this is because the relevant driving motors have not only come to a stop in undefined fashion upon power failure but these driving motors also work against an undefined load when they are started later.

The invention is based on the problem of providing a gear-cutting machine of the abovementioned type which ensures precise continuation of gear-cutting work later in case of a significant line voltage drop or complete power failure.

This problem is solved in a machine tool, in particular gear-cutting machine, of the abovementioned type by a monitoring device which detects a significant drop in line voltage and provides a corresponding signal to the controller, and an emergency power supply which, upon a drop in line voltage, supplies at least one of the actuators with enough energy to permit controlled stopping of the driving motor belonging to said actuator.

It is expedient to couple all actuators for the adjusting axes involved in the so-called electronic gears with the emergency power supply so that all driving motors of the adjusting axes in service upon the line drop or power failure can be stopped in controlled fashion and moved on later with a defined contact point. However it is within the scope of the invention if only one actuator or a part of all actuators are fed by the emergency power supply, provided this measure suffices to interrupt the machining operation and continue it again later in defined fashion.

In a special and independently protected embodiment, the emergency power supply has a motor with a disk flywheel mounted on the shaft thereof, the motor being regulated by the controller.

Such a design of the emergency power supply is of advantage because the motor can be formed similarly to the various driving motors for the adjusting axes, and because a similar actuator can furthermore be provided for this motor as is present for the various driving motors of the adjusting axes.

In service the motor of the emergency power supply is run up to a certain nominal speed. At this nominal speed the following energy is stored in the flywheel seated on the output shaft of the motor:

$$E = \tfrac{1}{2} J_{gas} \Omega^2$$

whereby $J_{gas} = J_{flywheel\ mass} + J_{motor\ armature}$ $J_{flywheel\ mass}$ = mass moment of inertia of flywheel $J_{motor\ armature}$ = mass moment of inertia of motor armature $\Omega$ = angular velocity of motor armature When the monitoring device ascertains that the line voltage has dropped significantly, i.e. by more than a certain threshold value, it provides a corresponding signal to the controller. The controller then controls the motor of the emergency power supply such that the motor works in generating service, i.e. is braked. This causes part of the energy stored in the flywheel and armature of the motor to be reconverted into electric energy. This electric energy is made available for one or more actuators of one or more driving motors of the gear-cutting machine. In a special embodiment of the invention, the direct-current source is a dc intermediate circuit of a dc converter and both the actuators of the driving motors for the adjusting axes and the motor of the emergency power supply are connected to the dc intermediate circuit.

The motor of the emergency power supply can be designed as a dc motor. In this case simple electronics suffice for switching the motor to generating service when a line drop is reported to the controller. In a preferred embodiment the motor of the emergency power supply is an ac motor. This motor can be driven in the same way as the driving motors for the various adjusting axes by a similarly designed actuator. For this purpose the motor of the emergency power supply has an actuator/rectifier coordinated therewith. In normal operation of the machine tool the controller first ensures that the actuator/rectifier receives suitable control signals so that the motor and the disk flywheel rotating therewith reach a predetermined nominal speed and hold this nominal speed.

When the controller is signaled a significant line drop, the controller gives the actuator/rectifier control signals which ensure generating service of the motor. This brakes the motor and thus the disk flywheel. The brake energy becomes available in the form of electric energy. The actuator/rectifier converts this alternating-current energy into direct voltage which is coupled into the dc intermediate circuit and thus made available for one, several or all actuators of the various driving motors. This permits e.g. the driving motor for rotating the tool to be stopped in defined fashion after the tool has been lifted off the workpiece.

When the machine tool is restarted after the line voltage becomes available again, this starting takes place out of a defined initial state so that the entire cutting work takes place in completely controlled fashion.

In the following an embodiment of the invention will be explained more closely with reference to the drawings, in which:

FIG. 1 shows a schematic view of an electronic control device for a gear-cutting machine with an emergency power supply, and FIG. 2 shows a schematic, perspective view of a gear-cutting machine as an example of a numerically controlled machine tool wherein the present invention is applied.

The structure of the gear-cutting machine shown in FIG. 2 was explained above.

FIG. 1 shows controller 30 (CMC) housed for example in control box 12 in FIG. 2 for controlling the entire control sequences of the gear-cutting machine in FIG. 2.

From three-phase network 20 rectifier circuit 22 receives alternating voltage. This alternating voltage is converted by rectifier circuit 22 into direct voltage which is made available in the known fashion by so-called dc intermediate circuit 24. Connected to dc intermediate circuit 24 shown in FIG. 1 are a plurality of modular actuators. These actuators work in the known fashion so that details can be dispensed with. The function of the actuators is indicated by a thyristor symbol in each case. For example actuator 26B is provided for driving motor 28 which is provided for adjusting axis B. This is indicated in the motor symbol by the letters M and B. Similarly, motor 28 for adjusting axis C has actuator 26C coordinated therewith. For further adjusting axes X, Z and V actuators 26X, 26Z and 26V are provided.

Individual actuators 26B, 26C . . . receive energy from dc intermediate circuit 24 to operate corresponding motors 28 in accordance with control signals supplied to various actuators 26B, 26C . . . by controller 30 via line L1. Control line L1 is a multiwire drive control bus, the "5" here indicated that five actuators are driven via drive bus L1. Monitor 44 can be connected to controller 30 to permit an operator to read status information for the machine.

Rectifier circuit 22 has line drop detector 42 coordinated therewith. Line drop detector 42 is a voltage detection circuit, this circuit itself having a threshold control coordinated therewith, or such a threshold control being formed within controller 30. The signal fed by voltage detector 42 to controller 30 via signal line L2 in any case enables controller 30 to signal a significant line drop (including complete power failure). In such a case controller 30 provides a control signal to actuator/rectifier 40 via control line L3.

Actuator/rectifier 40 is located in line 32 connecting motor 34 with dc intermediate circuit 24. Ac motor 34 is driven by the actuator/rectifier at the onset of operation of the machine shown in FIG. 2 such that motor 34 is brought to a predetermined nominal speed. Disk flywheel 36 thus also rotates at this nominal speed. Disk flywheel 36 is seated on output shaft 38 of ac motor 34.

When controller 30 ascertains a significant line drop it gives actuator/rectifier 40 via line L3 a signal so as to put the motor in generating service. That is, the motor acts as a brake for the flywheel mass which is formed from the flywheel mass of disk flywheel 36 and the flywheel mass of the motor armature not specified here. This brake energy in generating service is converted by actuator/rectifier 40 into direct voltage which is coupled into dc intermediate circuit 24.

During generating service of motor 34 a direct voltage is thus available in dc intermediate circuit 24 despite a line drop or power failure, said voltage being drawn for example by actuator 26B to operate corresponding motor (MB) 28 such that the latter brings corresponding adjusting axis B into a defined state of rest in defined fashion. Furthermore actuator 26X for example can drive the driving motor for stand 4 shown in FIG. 2 such that stand 4 is drawn back from workpiece receiving table 6.

I claim:

1. A machine tool, in particular a gear-cutting machine, having a plurality of electric driving motors each for adjusting a respective axis of said machine tool, and one actuator provided for each respective driving motor, said actuator being connected to a direct-current source supplied from a network and controlled by an NC controller, said machine tool further comprising a monitoring device which detects a significant drop in line voltage and provides a corresponding signal to said NC controller, and an emergency power supply, connected to said network, which, upon a significant drop in line voltage, supplies at least one of said actuators with enough electric energy to permit controlled stopping of said driving motor corresponding to said respective actuator;

wherein said direct-current source is a dc intermediate circuit, said actuators of said driving motors are provided for adjusting respective axes, and a motor of said emergency power supply is connected to said d.c. intermediate circuit.

2. The machine tool of claim 1, characterized in that said motor of said emergency power supply has a disk flywheel mounted on a shaft thereof, and wherein said motor is regulated by said NC controller.

3. The machine tool of claim 1, characterized in that said motor of said emergency power supply is a d.c. motor.

4. The machine tool of claim 1, characterized in that said motor of said emergency power supply is an a.c. motor having an actuator/rectifier coordinated therewith which receives from said NC controller, control signals for reaching and holding a predetermined nominal speed, and control signals for operating said motor in generating service and feeding resulting electrical energy into said d.c. intermediate circuit in case of power failure.

* * * * *